United States Patent
Onoda et al.

(10) Patent No.: US 10,319,552 B2
(45) Date of Patent: Jun. 11, 2019

(54) BATTERY CONNECTION UNIT, AND ATTACHMENT STRUCTURE FOR BATTERY CONNECTION UNIT

(71) Applicants: Yazaki Corporation, Tokyo (JP); TOYOTA JIDOSHA KABUSHIKI KAISHA, Toyota-shi, Aichi-ken (JP)

(72) Inventors: Shinya Onoda, Shizuoka (JP); Muneyuki Fujisaka, Miyoshi (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/722,020

(22) Filed: Oct. 2, 2017

(65) Prior Publication Data

US 2018/0096814 A1    Apr. 5, 2018

(30) Foreign Application Priority Data

Oct. 4, 2016 (JP) ................................. 2016-196683

(51) Int. Cl.
*H01H 85/044* (2006.01)
*H01H 85/20* (2006.01)
(Continued)

(52) U.S. Cl.
CPC .......... *H01H 85/044* (2013.01); *H01H 85/20* (2013.01); *H01M 2/10* (2013.01); *H01H 2085/0555* (2013.01); *H01M 2220/20* (2013.01)

(58) Field of Classification Search
CPC ..... H01H 2085/025; H01H 2085/0555; H01H 85/044; H01H 85/20; H01H 85/2045; H01M 2/10; H01M 2220/20
(Continued)

(56) References Cited

U.S. PATENT DOCUMENTS 6,332,946 B1 * 12/2001 Emmett ............ H01L 21/67356
156/299
6,857,914 B1 * 2/2005 Spaulding ............ H01R 11/282
439/759
(Continued)

FOREIGN PATENT DOCUMENTS

DE           41 10 522 A1    10/1992
DE   10 2008 053 484 A1     5/2009
(Continued)

OTHER PUBLICATIONS

Communication dated Sep. 11, 2018, from Japanese Patent Office in counterpart application No. 2016-196683.
(Continued)

*Primary Examiner* — Jacob R Crum
(74) *Attorney, Agent, or Firm* — Sughrue Mion, PLLC

(57) ABSTRACT

A battery connection unit includes an electronic component electrically connected to a battery terminal and a terminal of an electric wire, and an insulating support member that includes a first support body and a second support body and that supports the electronic component, where the first support body is disposed across a space in such a way that a first gap to a first surface becomes a first reference gap, the second support body is disposed across a space in such a way that a second gap to a second surface becomes a second reference gap, at least one first spring member that contacts the first surface while maintaining the first reference gap after attachment to the battery is disposed on the first support body, and at least one second spring member that contacts the second surface while maintaining the second reference gap is disposed on the second support body.

6 Claims, 13 Drawing Sheets

(51) Int. Cl.
*H01M 2/10* (2006.01)
*H01H 85/055* (2006.01)

(58) Field of Classification Search
USPC .......................................................... 337/142
See application file for complete search history.

(56) References Cited

U.S. PATENT DOCUMENTS

| | | | | |
|---|---|---|---|---|
| 7,663,466 | B1* | 2/2010 | Jetton | H01H 85/044 |
| | | | | 337/186 |
| 7,995,344 | B2* | 8/2011 | Dando, III | H05K 7/20454 |
| | | | | 165/104.33 |
| 2002/0134572 | A1* | 9/2002 | Matsumura | H01H 85/044 |
| | | | | 174/66 |
| 2009/0108981 | A1* | 4/2009 | Iwata | G01R 1/0408 |
| | | | | 337/186 |
| 2009/0108982 | A1* | 4/2009 | Ohashi | H01H 85/044 |
| | | | | 337/191 |
| 2011/0306243 | A1* | 12/2011 | Shiraki | H01R 11/287 |
| | | | | 439/620.29 |
| 2012/0302098 | A1* | 11/2012 | Matsumoto | H01H 85/12 |
| | | | | 439/620.26 |
| 2015/0099149 | A1* | 4/2015 | Byun | H01M 2/345 |
| | | | | 429/61 |

FOREIGN PATENT DOCUMENTS

| | | |
|---|---|---|
| DE | 11 2011 100 497 B4 | 2/2016 |
| JP | 2001-256878 A | 9/2001 |
| JP | 2009-110856 A | 5/2009 |
| JP | 2010061813 A | 3/2010 |
| JP | 2016131116 A | 7/2016 |

OTHER PUBLICATIONS

Communication dated Nov. 13, 2018, from German Patent and Trademark Office in counterpart application No. 10 2017 217 545.1.

\* cited by examiner

BATTERY CONNECTION UNIT, AND ATTACHMENT STRUCTURE FOR BATTERY CONNECTION UNIT

CROSS-REFERENCE TO RELATED APPLICATION(S)

The present application claims priority to and incorporates by reference the entire contents of Japanese Patent Application No. 2016-196683 filed in Japan on Oct. 4, 2016.

BACKGROUND OF THE INVENTION

1. Field of the Invention

The present invention relates to a battery connection unit, and an attachment structure for the battery connection unit.

2. Description of the Related Art

Conventionally, there is known a battery connection unit which is attached to a battery. The battery connection unit has an electronic component supported by a support member, and is installed on two orthogonal surfaces of a cuboid battery and is attached to the battery through a battery terminal (which is physically and electrically connected to a battery post provided on one of the surfaces). The support member is L-shaped so as to extend along two surfaces of the battery for realization of such arrangement on the battery. According to such a battery connection unit, a terminal of an electric wire which is electrically connected to the electronic component is supported by the support member, and also, the electric wire is extended outward of the support member. For example, in addition to wire harnesses on the cathode side and the anode side, a circuit protection unit and the like are attached, as the battery connection unit, to a vehicle battery. Japanese Patent Application Laid-open Nos. 2001-256878 and 2009-110856 disclose fuse units as the circuit protection unit. The fuse units include a circuit protection component (fuse circuit body) as an electronic component arranged on a protection circuit which is a protection target, and a support member that supports the circuit protection component.

In the case where a battery is attached to a vehicle, vibration of the vehicle body due to road surface input or the like is transferred to the battery or an electric wire, and the vibration is transmitted to the battery connection unit as an external input through the battery or the electric wire. Accordingly, the battery connection unit possibly causes a load according to the external input to act on a battery terminal or a battery post. For example, at the battery connection unit, the electric wire is extended outward of the support member, and thus, the amount of relative movement of the electric wire with respect to the vehicle body possibly becomes greater than the amount of relative movement of the battery with respect to the vehicle, and the external input from the electric wire possibly becomes greater than the external input from the battery. Accordingly, if this possibility is realized, the load on the battery terminal or the battery post from the battery connection unit is possibly made great due to the external input from the electric wire.

SUMMARY OF THE INVENTION

Accordingly, the present invention has its object to provide a battery connection unit and an attachment structure for the battery connection unit which are capable of reducing a load on the battery side.

In order to achieve the above mentioned object, a battery connection unit according to one aspect of the present invention includes an electronic component that is electrically connected to a battery terminal that is physically and electrically connected to a battery post on a first surface of a battery, and that is electrically connected to a terminal of an electric wire; and an insulating support member that includes a first support body and a second support body that is continuous to the first support body in an intersected manner, and that supports the electronic component, wherein the first support body is disposed across a space in such a way that a first gap to the first surface becomes a first reference gap after attachment to the battery, and includes a fixed section to be connected to a fixing section of the battery terminal, the second support body is disposed across a space in such a way that a second gap to a second surface of the battery intersecting the first surface becomes a second reference gap after attachment to the battery, and includes a connection section to which a terminal of the electric wire extended outward is to be connected, at least one first spring member that contacts the first surface while maintaining the first reference gap after attachment to the battery, and that is capable of deformation in a direction of reducing the first gap according to an external input, is disposed on the first support body, on a side facing the first surface, and at least one second spring member that contacts the second surface while maintaining the second reference gap after attachment to the battery, and that is capable of deformation in a direction of reducing the second gap according to an external input, is disposed on the second support body, on a side facing the second surface.

According to another aspect of the present invention, in the battery connection unit, it is desirable that the first spring member and the second spring member are each a flat spring that is formed into an arc, the first support body includes a first spring support section that is capable of supporting supported sections on both ends, in a circumferential direction, of the first spring member while relatively moving each of the supported sections according to the deformation, and the second support body includes a second spring support section that is capable of supporting supported sections on both ends, in a circumferential direction, of the second spring member while relatively moving each of the supported sections according to the deformation.

According to still another aspect of the present invention, in the battery connection unit, it is desirable that the electronic component is a fuse circuit body.

In order to achieve the above mentioned object, an attachment structure for a battery connection unit according to still another aspect of the present invention includes an electronic component that is electrically connected to a battery terminal that is physically and electrically connected to a battery post on a first surface of a battery, and that is electrically connected to a terminal of an electric wire, and an insulating support member that includes a first support body and a second support body that is continuous to the first support body in an intersected manner, and that supports the electronic component, wherein the first support body is disposed across a space in such a way that a first gap to the first surface becomes a first reference gap after attachment to the battery, includes a fixed section to be connected to a fixing section of the battery terminal, and includes, on a side facing the first surface, at least one first spring member that contacts the first surface while maintaining the first reference gap after attachment to the battery, and that is capable of deformation in a direction of reducing the first gap according to an external input, and the second support body is disposed across a space in such a way that a second gap to a second surface of the battery intersecting the first surface becomes a second reference gap after attachment to the battery, includes a connection section to which a terminal of the electric wire extended outward is to be connected, and includes, on a side facing the second surface, at least one second spring member that contacts the second surface while maintaining the second reference gap after attachment to the battery, and that is capable of deformation in a direction of reducing the second gap according to an external input.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment will be described in detail with reference to the drawings with respect to a battery connection unit and an attachment structure for the battery connection unit according to the present invention. Additionally, the invention is not limited by the embodiment.

Embodiment

An embodiment of a battery connection unit and an attachment structure for the battery connection unit according to the present invention will be described with reference to FIGS. 1 to 13.

Figure 1:
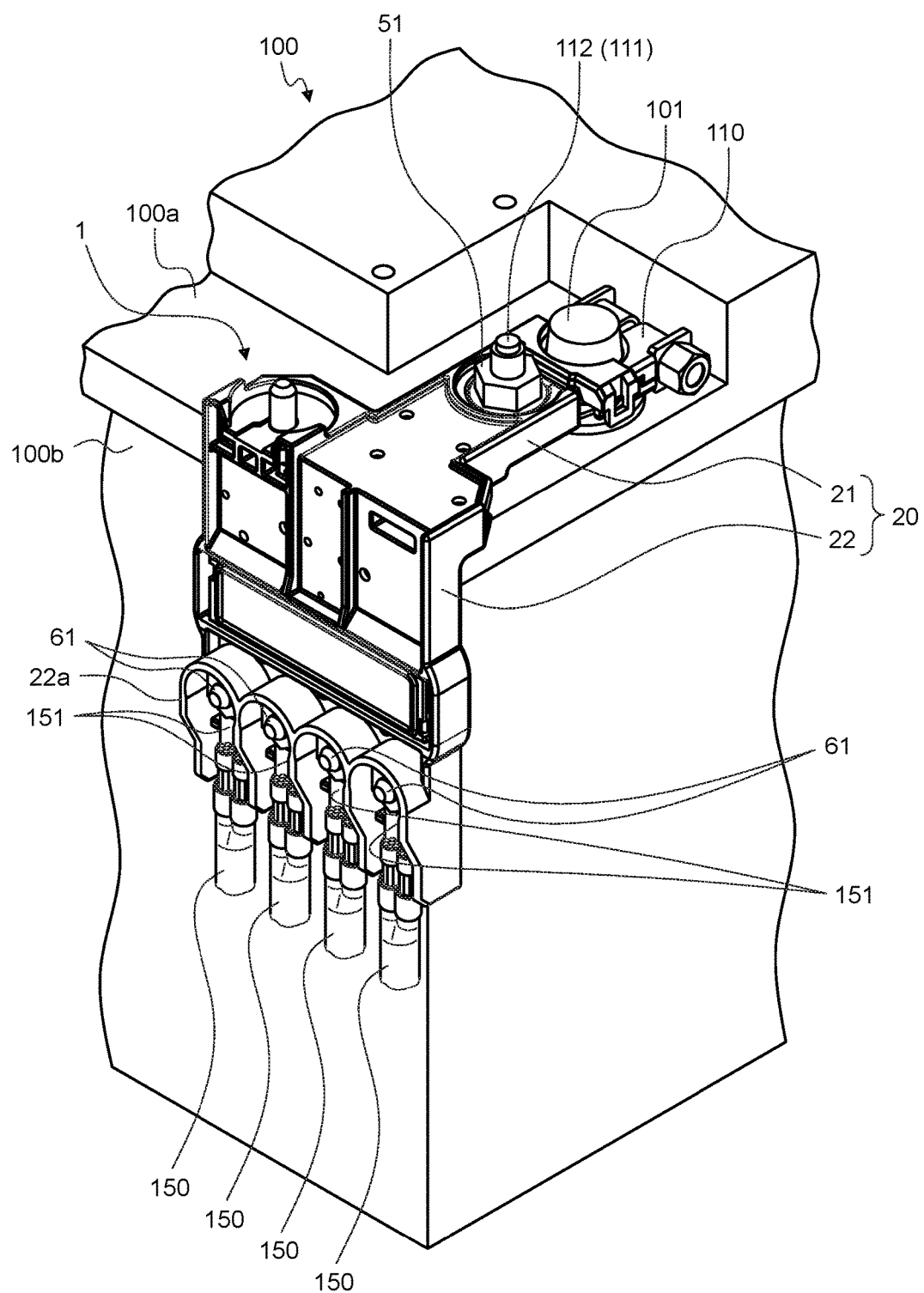
FIG. 1 is a perspective view illustrating a battery connection unit according to an embodiment, which is attached to a battery.
Figure 2:
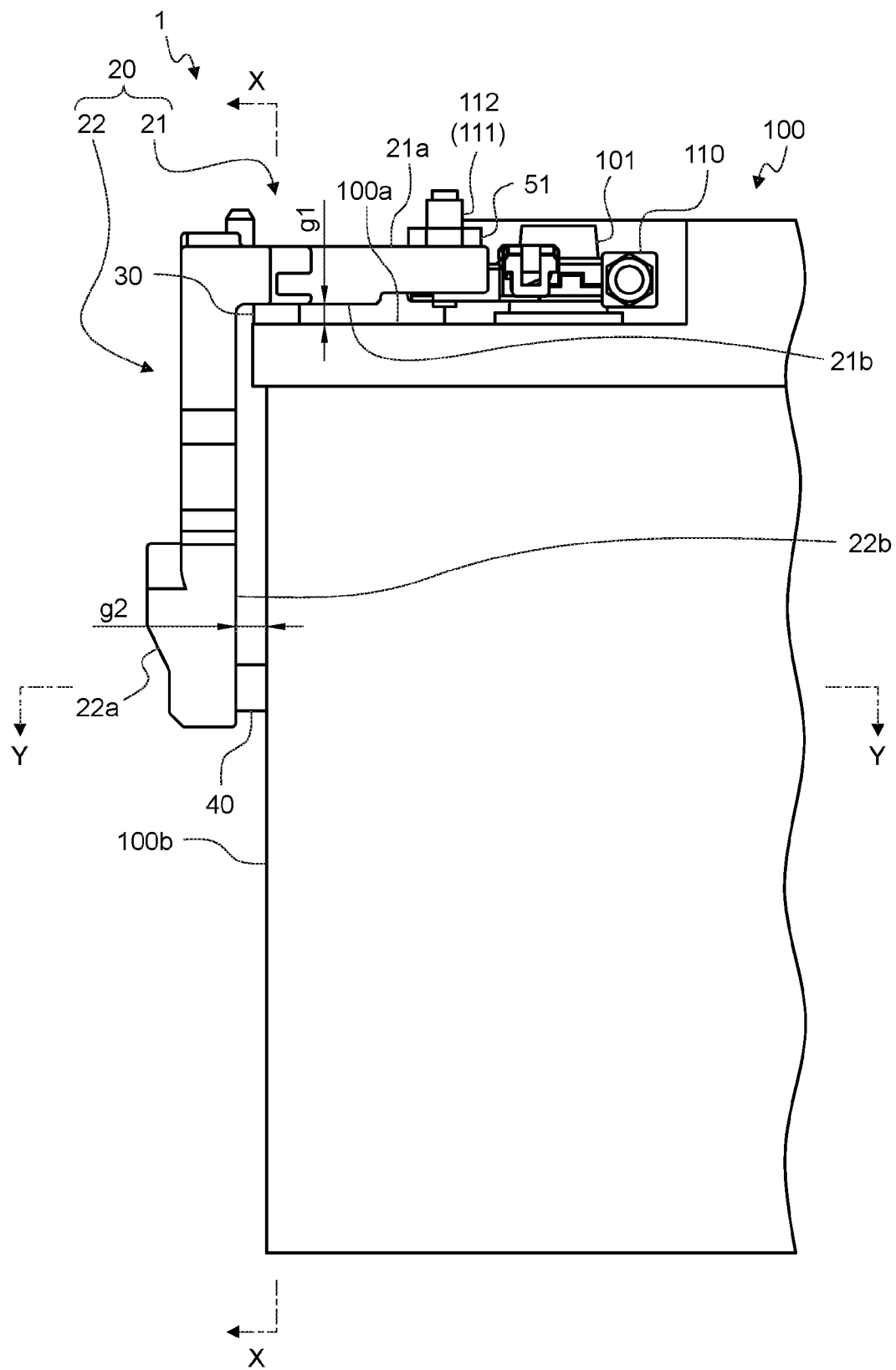
FIG. 2 is a side view illustrating the battery connection unit according to the embodiment, which is attached to the battery.

Reference numeral 1 in FIGS. 1 to 5 refers to the battery connection unit according to the present embodiment. A battery connection unit 1 is a connection unit to be connected to a battery 100, and includes an electronic component 10 (FIGS. 5 and 6) and a support member 20. The battery connection unit 1 also includes first and second spring members 30, 40 to be interposed between the battery connection unit and the battery 100 (FIG. 2). The cuboid battery 100 illustrated has a conductive battery terminal 110 physically and electrically connected to a battery post 101 on a first surface 100a among six roughly divided surfaces. The battery connection unit 1 is physically and electrically connected to the battery terminal 110.

The electronic component 10 is electrically connected to the battery terminal 110, and is electrically connected to a terminal of an electric wire 150. In the present embodiment, a protection circuit component (fuse circuit body) is illustrated as the electronic component 10 (FIG. 6), and the electronic component 10 is contained in the support member 20 while being partially exposed to outside. The illustrated electronic component 10 is formed to have a plate shape with a metal plate as the base material, and includes at least a first conductor 11, which is physically and electrically connected to a fixing section 111 of the battery terminal 110, a second conductor 12, which is physically and electrically connected to the terminal of the electric wire 150, and a fuse element 13, which is provided between the first conductor 11 and the second conductor 12.

The first conductor 11 is disposed in such a way that one flat surface faces the first surface 100a after the first conductor 11 is attached to the battery 100. In contrast, the second conductor 12 is disposed in such a way that one flat surface faces a second surface 100b of the battery 100 after the second conductor 12 is attached to the battery 100. The first surface 100a and the second surface 100b are surfaces that intersect each other (orthogonally, in the present case). The first conductor 11 and the second conductor 12 intersect each other according to the intersected state (orthogonally intersected state) of the first surface 100a and the second surface 100b. Accordingly, the electronic component 10 is bent into an L shape.

In this example, the fuse element 13 is disposed facing the second surface 100b. Accordingly, the illustrated electronic component 10 has a third conductor 14, which is disposed on the same flat surface as the second conductor 12, interposed between the first conductor 11 and the fuse element 13.

Figure 5:
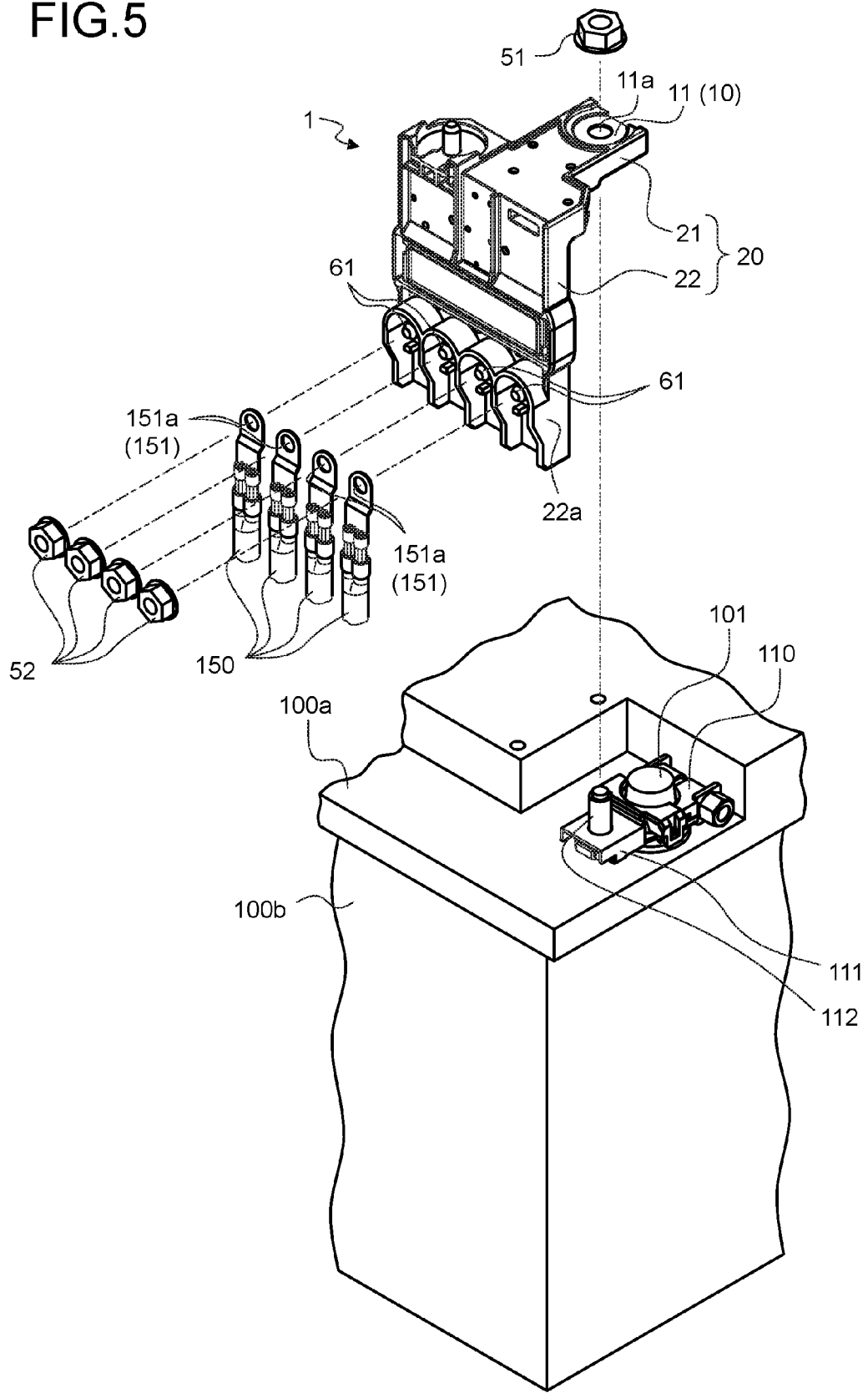
FIG. 5 is a perspective view illustrating the battery connection unit according to the embodiment, before the battery connection unit is attached to the battery.
Figure 6:
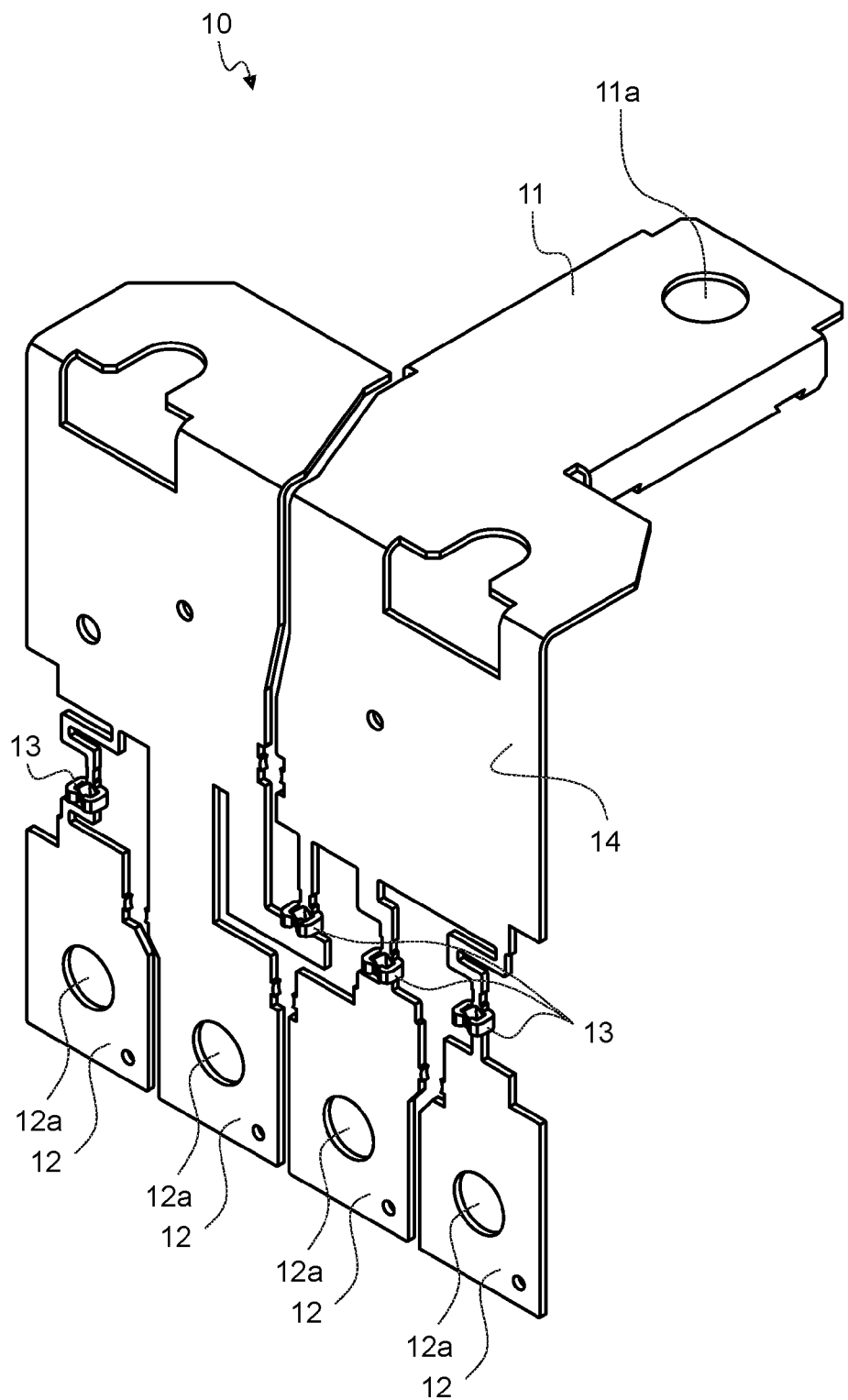
FIG. 6 is a perspective view illustrating an example of an electronic component.

At the battery terminal 110, a conductive external thread member 112 is provided to the fixing section 111 (FIGS. 1 to 5). The external thread member 112 protrudes from the fixing section 111 in the same direction as the battery post 101. A through hole 11a allowing insertion of the external thread member 112 is formed to the first conductor 11 (FIGS. 5 and 6). The first conductor 11 is physically and electrically connected to the battery terminal 110 by causing the external thread member 112 to contact the fixing section 111 through insertion through the through hole 11a and by screwing together the external thread member 112 and an internal thread member 51 (FIGS. 1 to 5).

Figure 3:
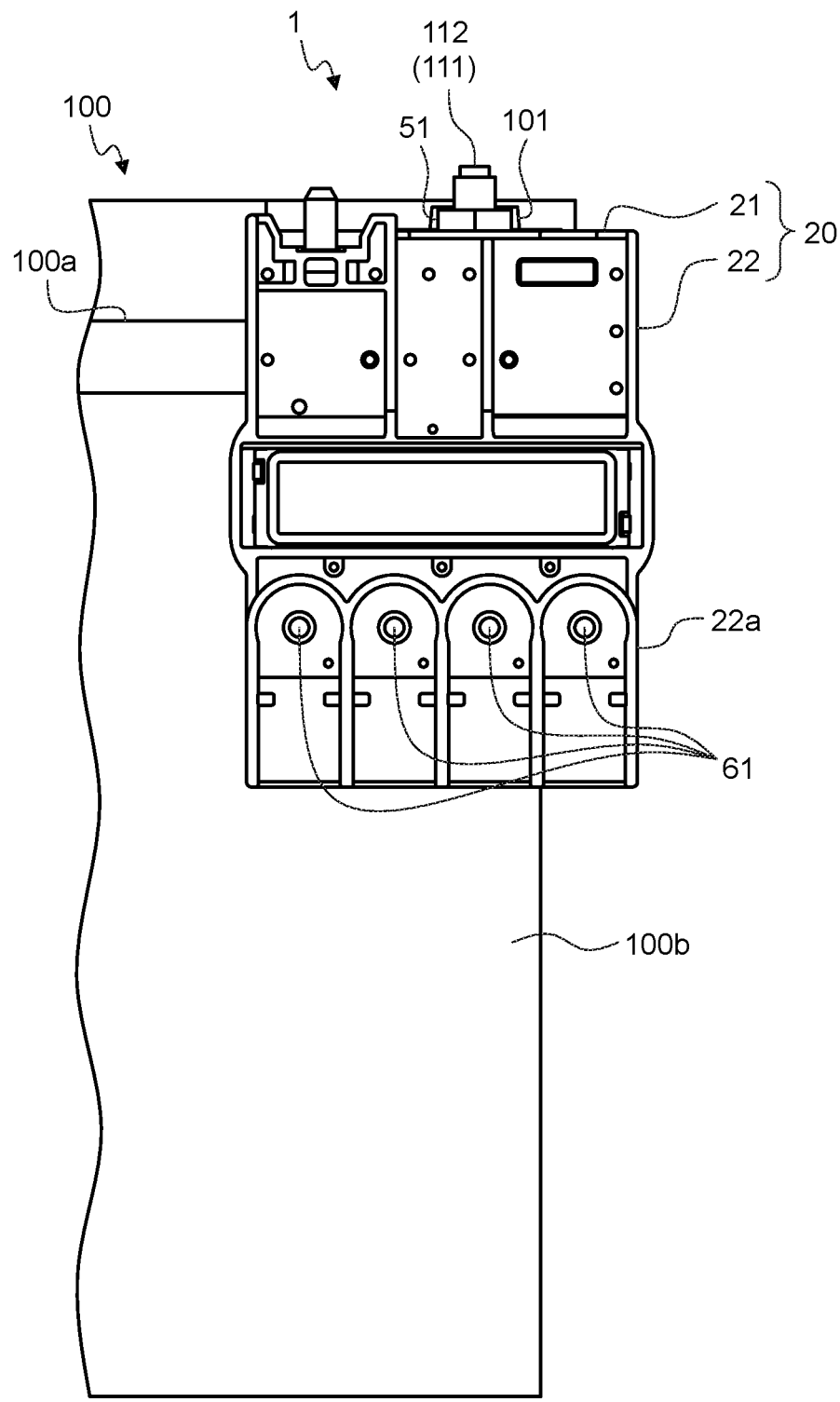
FIG. 3 is a front view illustrating the battery connection unit according to the embodiment, which is attached to the battery.
Figure 4:
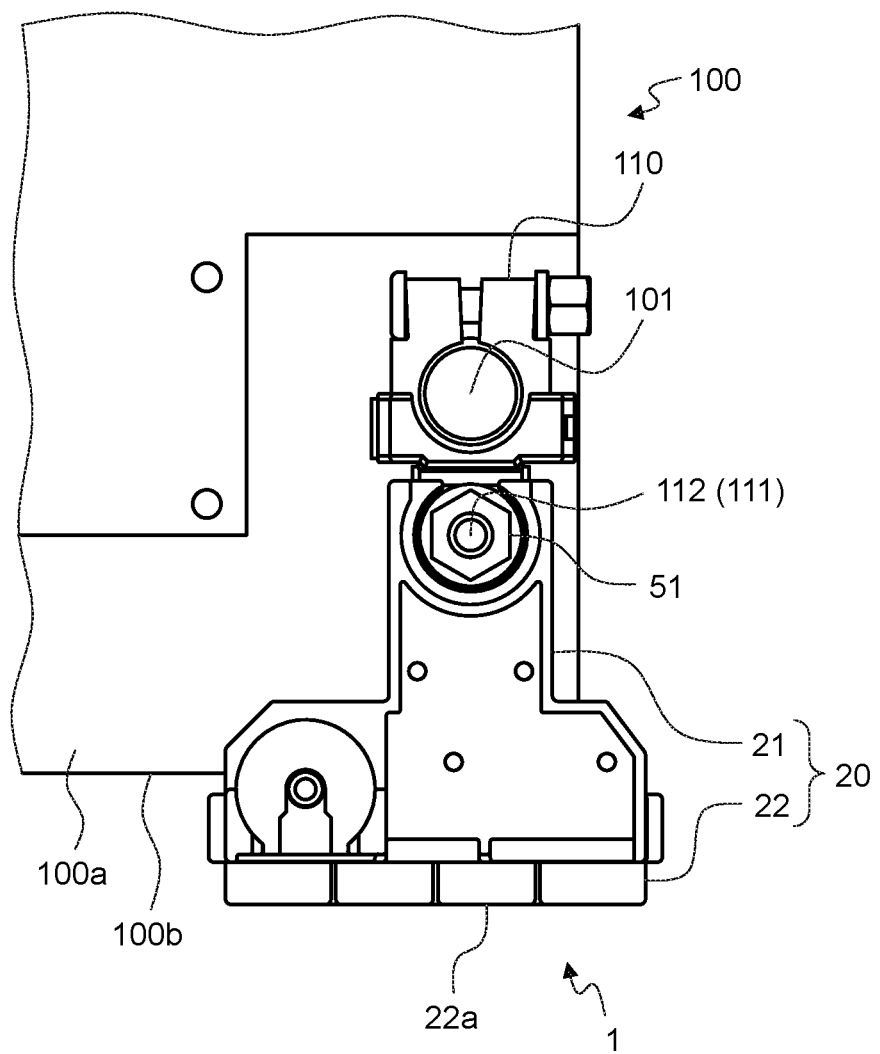
FIG. 4 is a top view illustrating the battery connection unit according to the embodiment, which is attached to the battery.

A through hole 12a is formed to the second conductor 12 (FIG. 6). The battery connection unit 1 includes an external thread member 61 to be inserted into the through hole 12a (FIGS. 1, 3 and 5). The external thread member 61 is also inserted into a through hole 151a (FIG. 5) of a conductive terminal 151 provided to the terminal of the electric wire 150. The second conductor 12 is physically and electrically connected to the terminal 151 by screwing an internal thread member 52 (FIG. 5) with the external thread member 61 to which the terminal 151 is attached, and is thereby electrically connected to the electric wire 150.

The support member 20 is formed of an insulating material of synthetic resin. The illustrated support member 20 is formed in an integrated manner by placing the electronic component 10 and the external thread member 61 inserted in the through hole 12a in a mold, and by causing liquid synthetic resin to flow into the mold. The electronic component 10 and the external thread member 61 are thus supported inside the support member 20. At the time of integrated formation, the support member 20 is formed to expose the through hole 11a of the first conductor 11 and its surroundings to the outside, to also expose the through hole 12a of the second conductor 12 and its surroundings and the external thread member 61 to the outside, and to also expose the fuse element 13 to the outside.

The support member 20 includes a first support body 21, and a second support body 22, which is continuous to the first support body 21 in an intersected manner (FIGS. 1 to 5). The first support body 21 and the second support body 22 intersect each other according to the intersected state (orthogonally intersected state) of the first surface 100a and the second surface 100b, and form an L shape.

Figure 7:
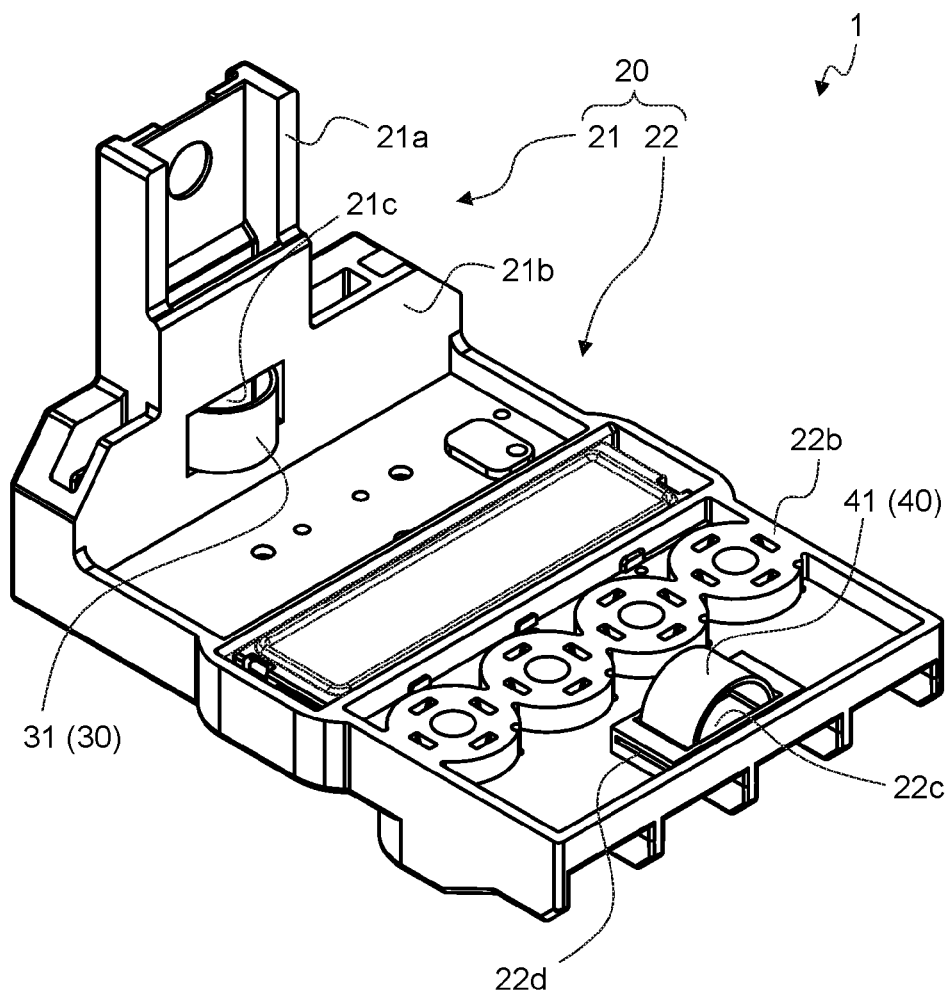
FIG. 7 is a perspective view of the battery connection unit as seen from a different angle.
Figure 8:
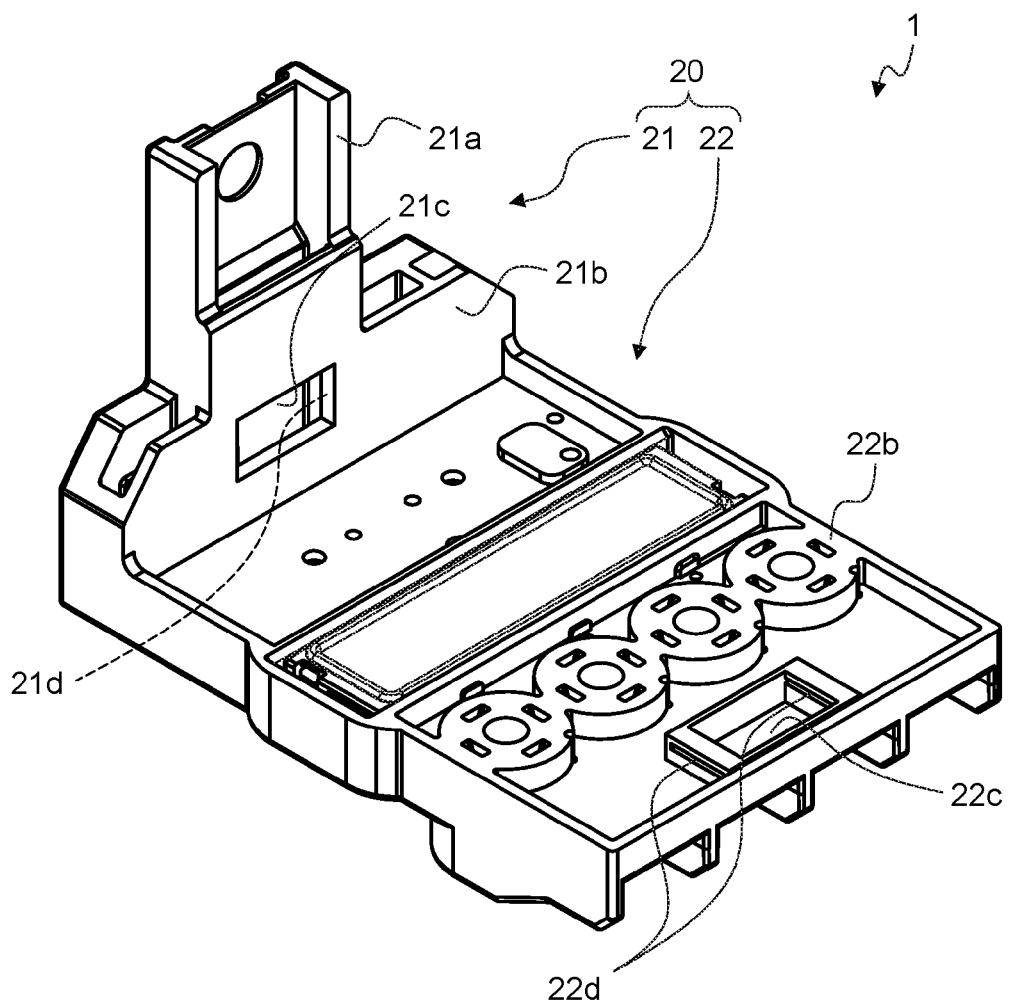
FIG. 8 is a perspective view illustrating a state where first and second spring members have been removed from the battery connection unit.
Figure 9:
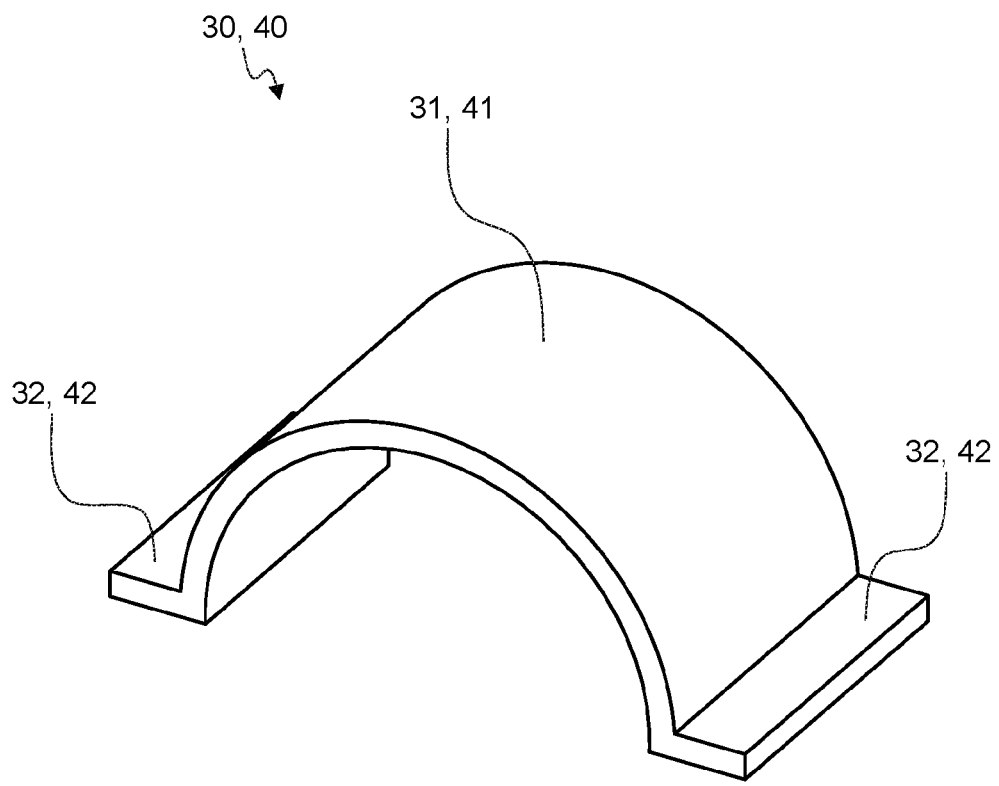
FIG. 9 is a perspective view illustrating the first and the second spring members.

The first support body 21 is a support body which contains and supports the first conductor 11, and is disposed across a space in such a way that a first gap g1 to the first surface 100a becomes a first reference gap gd1 after attachment to the battery 100 (FIG. 2). The first support body 21 includes a fixed section 21a to be connected to the fixing section 111 of the battery terminal 110. After being attached to the battery 100 (that is, when connected to the fixing section 111), the first support body 21 faces the first surface 100a at a wall surface 21b. The first gap g1 is the gap between the wall surface 21b facing the first surface 100a and the first surface 100a. The first reference gap gd1 is a reference value for the first gap g1, and is a design value set to specify the attachment state of the battery connection unit 1 on the battery 100. Also, the wall surface 21b is a part of the first support body 21 that comes closest to the first surface 100a after attachment to the battery 100. In the present example, a peripheral edge portion of the first support body 21, on the side of the first surface 100a, is the wall surface 21b (FIGS. 7 and 8).

The second support body 22 is a support body which contains and supports the second conductor 12, the third conductor 14 and the fuse element 13, and is disposed across a space in such a way that a second gap g2 to the second surface 100b becomes a second reference gap gd2 after attachment to the battery 100 (FIG. 2). The second support body 22 includes a connection section 22a to which the terminal of the externally extended electric wire 150 (or more specifically, the terminal 151) is to be connected. After being attached to the battery 100 (that is, when the first support body 21 is connected to the fixing section 111), the second support body 22 faces the second surface 100b at a wall surface 22b. The second gap g2 is the gap between the wall surface 22b facing the second surface 100b and the second surface 100b. The second reference gap gd2 is a reference value for the second gap g2, and is a design value set to specify the attachment state of the battery connection unit 1 on the battery 100. Also, the wall surface 22b is a part of the second support body 22 that comes closest to the second surface 100b after attachment to the battery 100. In the present example, a flat surface portion of the second support body 22, on the side of the second surface 100b, is the wall surface 22b (FIGS. 7 and 8).

At the first support body 21, at least one first spring member 30, which contacts the first surface 100a while maintaining the first reference gap gd1 after attachment to the battery 100 and which is capable of being deformed in a direction of reducing the first gap g1 according to an external input, is disposed on the side facing the first surface 100a (in this case, on the side of the wall surface 21b described above). Also, at the second support body 22, at least one second spring member 40, which contacts the second surface 100b while maintaining the second reference gap gd2 after attachment to the battery 100 and which is capable of being deformed in a direction of reducing the second gap g2 according to an external input, is disposed on the side facing the second surface 100b (in this case, on the side of the wall surface 22b described above).

An external input is a force that is input to the battery connection unit 1 according to vibration or the like of the vehicle body, and is mainly input from the battery 100 or the electric wire 150. For example, vibration of the vehicle body transferred to the battery 100 is transmitted to the battery terminal 110 via the battery post 101, and is transferred to the battery connection unit 1 via the battery terminal 110 as an external input. Also, vibration of the vehicle body transferred to the electric wire 150 is transferred to the battery connection unit 1 via the terminal 151 as an external input. When an external input is applied, the battery connection unit 1 possibly moves relative to the battery 100 in a direction of reducing the first gap g1 or the second gap g2. Then, according to the relative movement, the battery connection unit 1 causes a load to act on the battery terminal 110, and a load to act also on the battery post 101 via the battery terminal 110.

However, according to the battery connection unit 1 of the present embodiment, the first spring member 30 and the second spring member 40, which contact the battery 100 and which are deformed in different directions, are disposed on the first support body 21 and the second support body 22, respectively, and thus, an external input from the battery 100 or the electric wire 150 may be dispersed and absorbed by the first spring member 30 and the second spring member 40. At this time, the first spring member 30 and the second spring member 40 are deformed in the directions of reducing the first gap g1 and the second gap g2. Accordingly, the battery connection unit 1 moves relative to the battery 100 by the amount of deformation, and a load on the battery connection unit 1 caused by the external input is reduced, and reduction in durability of the battery connection unit 1 may be suppressed. Furthermore, the first spring member 30 and the second spring member 40 disperse and absorb the external input by deforming in different directions, and the respective amounts of deformation may be reduced compared with a case of absorbing the external input by deformation in only one direction. Therefore, the battery connection unit 1 may reduce the amount of relative movement with respect to the battery 100 without increasing the spring force of each of the first spring member 30 and the second spring member 40, and the battery connection unit 1 can not only reduce the load on itself caused by the external input, but also reduce the load the battery connection unit 1 applies to the battery terminal 110 and the battery post 101. Accordingly, the battery connection unit 1 can suppress reduction in durability not only of itself, but also of the battery terminal 110 and the battery post 101. For example, compared with the battery 100, the relative movement of the electric wire 150 with respect to the vehicle body is possibly great, thereby possibly increasing the external input to the battery connection unit 1. Even if such great external input is input to the battery connection unit 1, the battery connection unit 1 can reduce the load on itself cause by the external input, and can also reduce the load acting on the battery terminal 110 and the battery post 101, and thus, the battery connection unit 1 can suppress reduction in durability of itself, and can also suppress reduction in durability of the battery terminal 110 and the battery post 101.

In the following, a concrete example will be described with respect to the first spring member 30 and the second spring member 40.

The first spring member 30 and the second spring member 40 are each a flat spring that is formed into an arc, and are formed with a metal plate as the base material (FIG. 9), for example. The first spring member 30 and the second spring member 40 each include an arc portion 31, 41 formed into an arc, and rectangular sheet-like supported sections 32, 42 protruding radially outward from both ends in the circumferential direction of the arc portion 31, 41. The two supported sections 32 of the first spring member 30 protrude in opposite directions on the same plane. The two supported sections 42 of the second spring member 40 protrude in opposite directions on the same plane.

Figure 10:
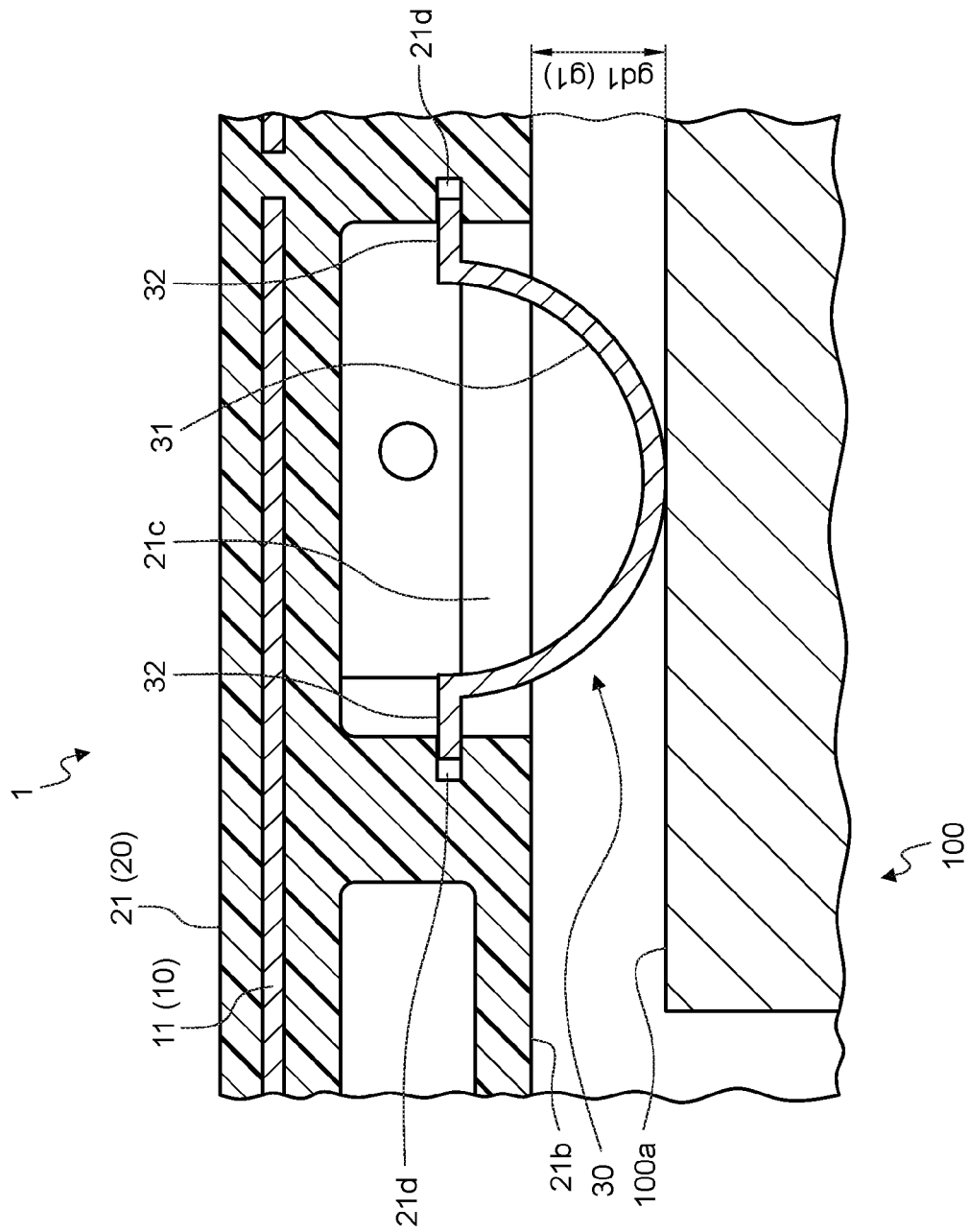
FIG. 10 is a cross-sectional view taken along line X-X in FIG. 2, and is an enlarged view of the first spring member and its surroundings.

When the battery connection unit 1 is attached to the battery 100, an outer circumferential surface of the arc portion 31 of the first spring member 30 contacts the first surface 100a of the battery 100 (FIG. 10). If an external input is not input in this contact state, the first spring member 30 maintains the first reference gap gd1 between the wall surface 21b of the first support body 21 and the first surface 100a. That is, the first spring member 30 causes the arc portion 31 to be supported by the wall surface 21b of the first support body 21 while protruding from the wall surface 21b.

At the first support body 21, the first spring member 30 is desirably supported at a position away from the fixed section 21a so that the first gap g1 is maintained at the first reference gap gd1. In the present example, the fixed section 21a is disposed on a free end side of the first support body 21, and thus, the first spring member 30 is supported on the second support body 22 side of the first support body 21. Also, at the first support body 21, the first spring member 30 is desirably supported on an extension of a fixation point to the battery terminal 110, in the extension direction of the first support body 21 (that is, one of protruding directions of the L shape), so that the first gap g1 is maintained at the first reference gap gd1.

Figure 11:
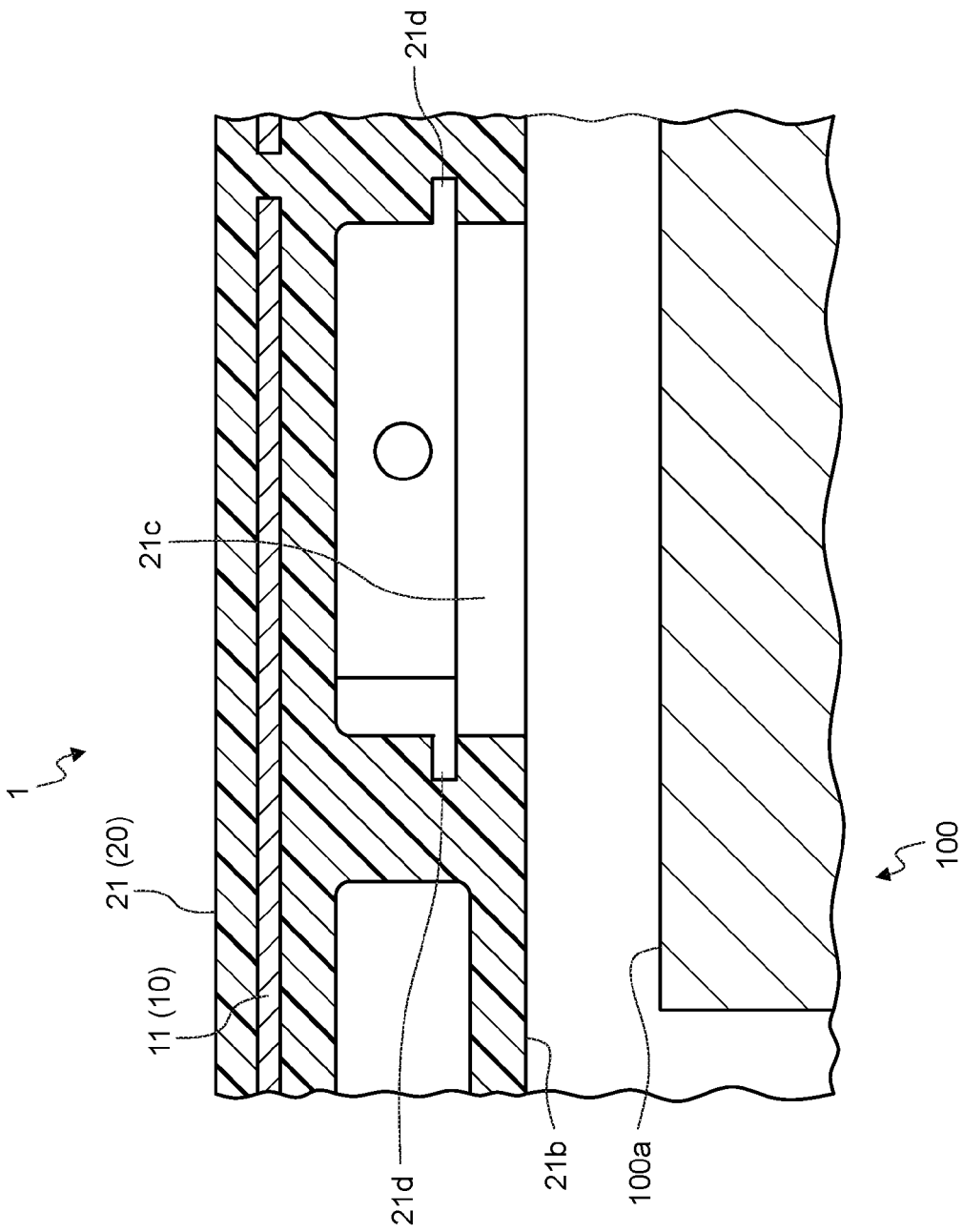
FIG. 11 is an explanatory diagram of a first spring housing section and a first spring support section, where the first spring member in FIG. 10 has been removed.

The first support body 21 includes a first spring housing section 21c, which houses the first spring member 30 in a state where the arc portion 31 is protruded, and a first spring support section 21d, for each supported section 32, which supports the supported section 32 in the housed state (FIGS. 8, 10 and 11). The first spring housing section 21c is a cuboid space. The first spring support section 21d is a space where the supported section 32 is to be inserted, and is communicated with the first spring housing section 21c. The first spring housing section 21c and the first spring support section 21d are formed in such a way that the supported section 32 is not inserted into the first spring support section 21d up to the base on the arc portion 31 side when the first spring member 30 is housed in the first spring housing section 21c. Moreover, the first spring support section 21d is formed in such a way that the supported section 32 is capable of relatively moving in the insertion direction in the space of the first spring support section 21d, and in such a way that the supported section 32 can be inserted up to the base on the arc portion 31 side according to deformation of the first spring member 30. The first spring support section 21d may thus support the supported section 32 while allowing the supported section 32 to relatively move according to deformation of the first spring member 30. The first spring member 30 can be deformed in the direction of reducing the first gap g1 in response to an external input to the battery connection unit 1, and also, when there is no more external input, the first spring member 30 returns to the original shape due to cancellation of the deformation, and the first gap g1 can be returned to the first reference gap gd1.

Figure 12:
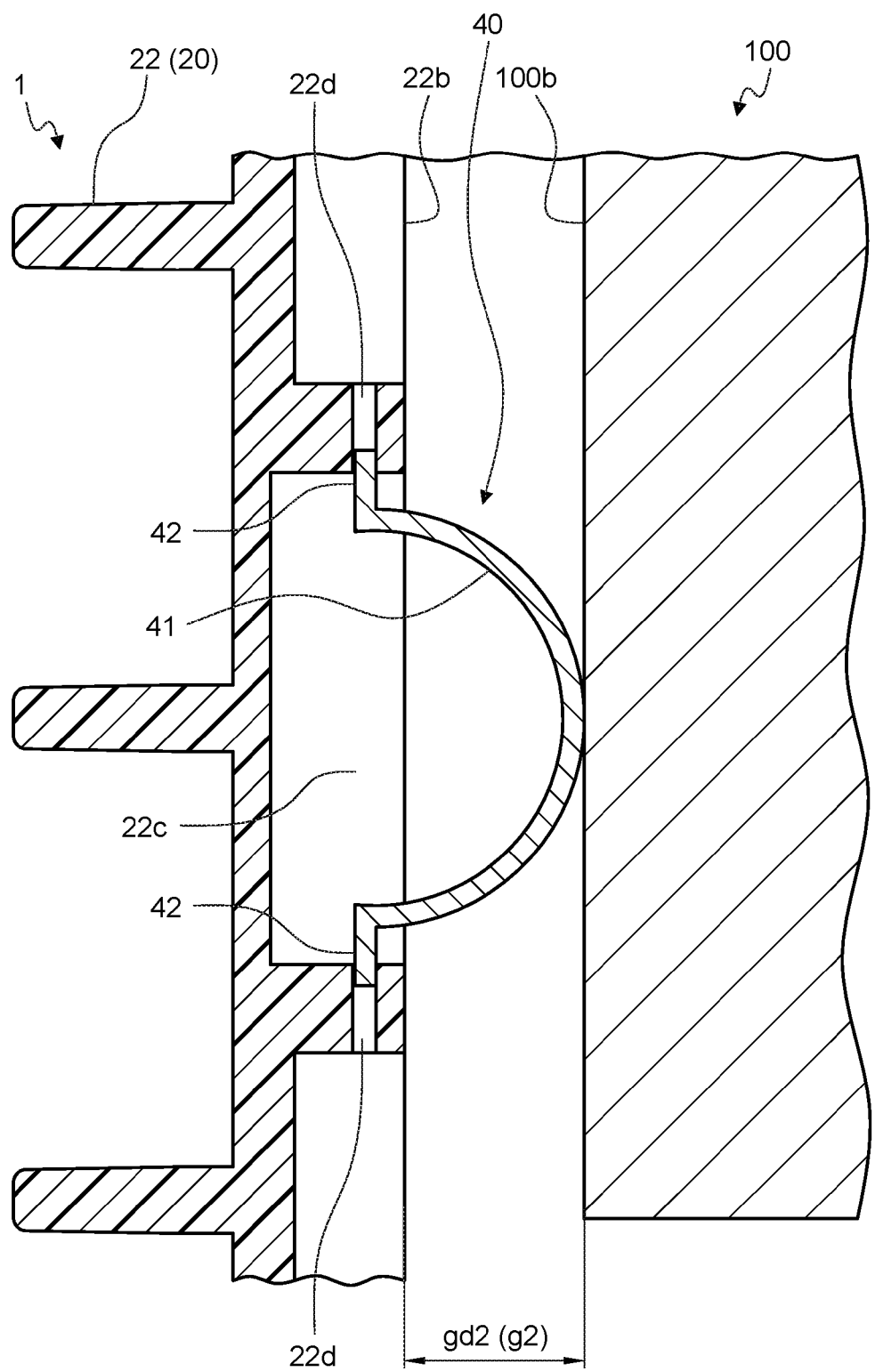
FIG. 12 is a cross-sectional view taken along line Y-Y in FIG. 2, and is an enlarged view of the second spring member and its surroundings.

When the battery connection unit 1 is attached to the battery 100, an outer circumferential surface of the arc portion 41 of the second spring member 40 contacts the second surface 100b of the battery 100 (FIG. 12). If an external input is not input in this contact state, the second spring member 40 maintains the second reference gap gd2 between the wall surface 22b of the second support body 22 and the second surface 100b. That is, the second spring member 40 causes the arc portion 41 to be supported by the wall surface 22b of the second support body 22 while protruding from the wall surface 22b.

At the second support body 22, the second spring member 40 is desirably supported at a position away from the fixed section 21a so that the second gap g2 is maintained at the second reference gap gd2. In the present example, the second spring member 40 is supported on a free end side of the second support body 22. Moreover, the second support body 22 desirably supports the second spring member 40 at a center portion in the width direction of the second support body 22 so as to maintain the second gap g2 at the second reference gap gd2. Additionally, the width direction is a direction orthogonal to the extension direction of the second support body 22 (that is, the other of protruding directions of the L shape), and is arrangement direction of the external thread members 61.

Figure 13:
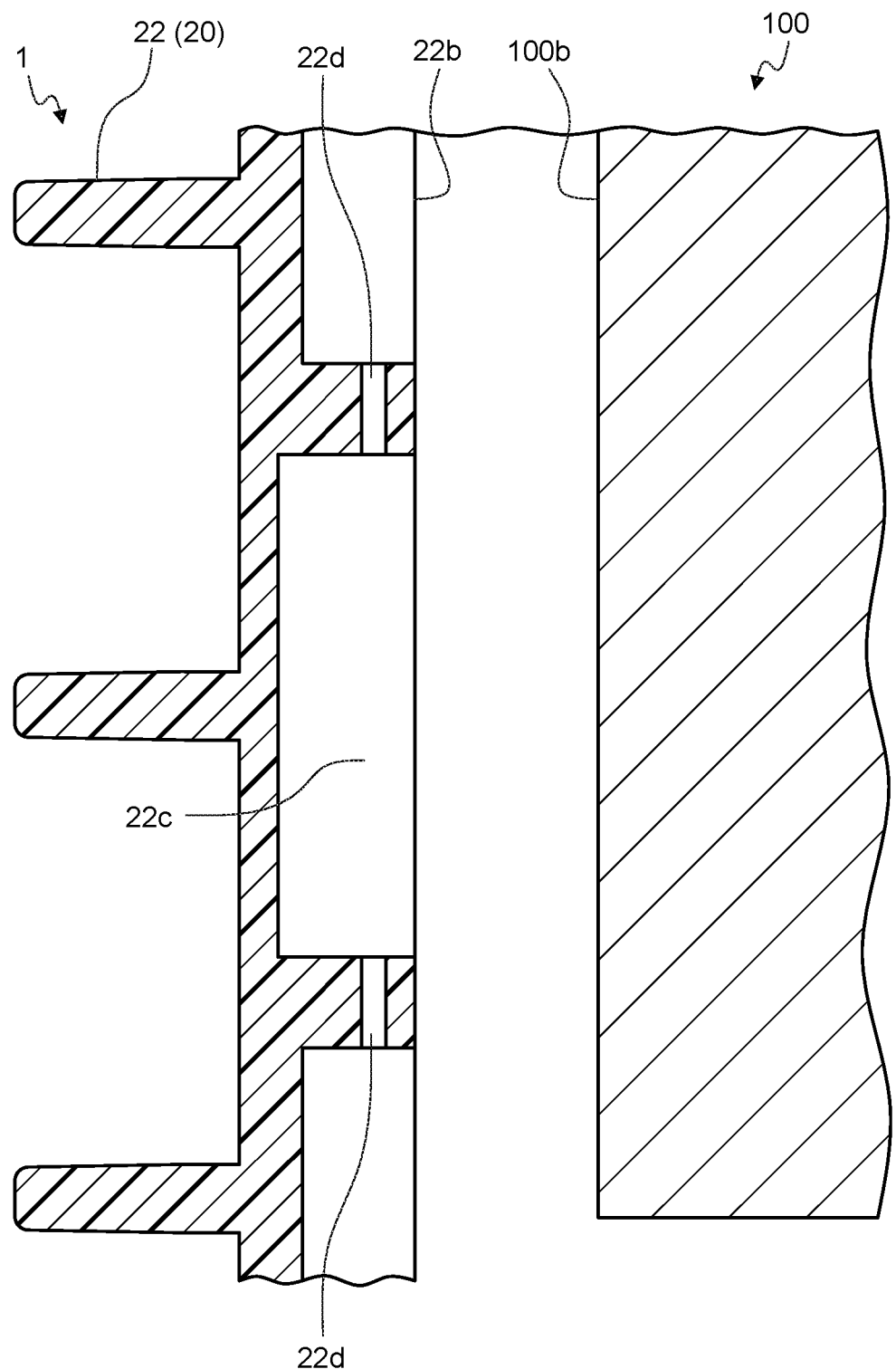
FIG. 13 is an explanatory diagram of a second spring housing section and a second spring support section, where the second spring member in FIG. 12 has been removed.

The second support body 22 includes a second spring housing section 22c, which houses the second spring member 40 in a state where the arc portion 41 is protruded, and a second spring support section 22d, for each supported section 42, which supports the supported section 42 in the housed state (FIGS. 8, 12 and 13). The second spring housing section 22c is a cuboid space. The second spring support section 22d is a space where the supported section 42 is to be inserted, and is communicated with the second spring housing section 22c. The second spring housing section 22c and the second spring support section 22d are formed in such a way that the supported section 42 is not inserted into the second spring support section 22d up to the base on the arc portion 41 side when the second spring member 40 is housed in the second spring housing section 22c. Moreover, the second spring support section 22d is formed in such a way that the supported section 42 is capable of relatively moving in the insertion direction in the space of the second spring support section 22d, and in such a way that the supported section 42 can be inserted up to the base on the arc portion 41 side according to deformation of the second spring member 40. The second spring support section 22d may thus support the supported section 42 while allowing the supported section 42 to relatively move according to deformation of the second spring member 40. The second spring member 40 can be deformed in the direction of reducing the second gap g2 in response to an external input to the battery connection unit 1, and also, when there is no more external input, the second spring member 40 returns to the original shape due to cancellation of the deformation, and the second gap g2 can be returned to the second reference gap gd2.

As described above, according to the battery connection unit 1 and the attachment structure for the battery connection unit 1 of the present embodiment, when an external input is applied from the battery 100 or the electric wire 150, the load on the battery connection unit 1 itself caused by the external input may be reduced by the first spring member 30 and the second spring member 40. Therefore, according to the battery connection unit 1 and the attachment structure for the battery connection unit 1, reduction in durability of the battery connection unit 1 itself may be suppressed. Furthermore, according to the battery connection unit 1 and the attachment structure for the battery connection unit 1, when an external input is applied from the battery 100 or the electric wire 150, the load caused by the battery connection unit 1 itself to act on the battery terminal 110 or the battery post 101 may be reduced by the first spring member 30 and the second spring member 40. Therefore, the battery connection unit 1 and the attachment structure for the battery connection unit 1 are capable of suppressing reduction in durability of the battery terminal 110 and the battery post 101, and may thus suppress reduction in durability of the battery 100.

According to the battery connection unit and the attachment structure for the battery connection unit of the present embodiment, when an external input is applied from the battery or the electric wire, the load on the battery connection unit itself caused by the external input may be reduced by the first spring member and the second spring member. Therefore, according to the battery connection unit and the attachment structure for the battery connection unit, reduction in durability of the battery connection unit itself may be suppressed. Furthermore, according to the battery connection unit and the attachment structure for the battery connection unit, when an external input is applied from the battery or the electric wire, the load caused by the battery connection unit itself to act on the battery terminal or the battery post may be reduced by the first spring member and the second spring member. Therefore, the battery connection unit and the attachment structure for the battery connection unit are capable of suppressing reduction in durability of the battery terminal and the battery post, and may thus suppress reduction in durability of the battery.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery connection unit comprising:
    an electronic component that is electrically connected to a battery terminal that is physically and electrically connected to a battery post on a first surface of a battery, and that is electrically connected to a terminal of an electric wire; and
    an insulating support member that includes a first support body and a second support body that is continuous to the first support body in an intersected manner, and that supports the electronic component, wherein
    the first support body is disposed across a space in such a way that a first gap to the first surface becomes a first reference gap after attachment to the battery, and includes a fixed section to be connected to a fixing section of the battery terminal,
    the second support body is disposed across a space in such a way that a second gap to a second surface of the battery intersecting the first surface becomes a second reference gap after attachment to the battery, and includes a connection section to which the terminal of the electric wire extended outward is to be connected,
    at least one first spring member that contacts the first surface while maintaining the first reference gap after attachment to the battery, and that is capable of deformation in a direction of reducing the first gap according to an external input, is disposed on the first support body, on a side facing the first surface, and
    at least one second spring member that contacts the second surface while maintaining the second reference gap after attachment to the battery, and that is capable of deformation in a direction of reducing the second gap according to an external input, is disposed on the second support body, on a side facing the second surface,
    the first spring member and the second spring member are each a flat spring that is formed into an arc,
    the first support body includes a first spring support section that is capable of supporting supported sections on both ends, in a circumferential direction, of the first spring member while relatively moving each of the supported sections according to the deformation,
    the second support body includes a second spring support section that is capable of supporting supported sections on both ends, in a circumferential direction, of the second spring member while relatively moving each of the supported sections according to the deformation,
    the at least one first spring member comprises a plurality of rectangular feet, and,
    each of the rectangular feet are extended in opposite directions away from the arc and into cavities within the support member.

2. The battery connection unit according to claim 1, wherein
    the electronic component is a fuse circuit, and
    the fuse circuit comprises a fuse.

3. An attachment structure for a battery connection unit including an electronic component that is electrically connected to a battery terminal that is physically and electrically connected to a battery post on a first surface of a battery, and that is electrically connected to a terminal of an electric wire, and an insulating support member that includes a first support body and a second support body that is continuous to the first support body in an intersected manner, and that supports the electronic component, wherein
    the first support body is disposed across a space in such a way that a first gap to the first surface becomes a first reference gap after attachment to the battery, includes a fixed section to be connected to a fixing section of the battery terminal, and includes, on a side facing the first surface, at least one first spring member that contacts the first surface while maintaining the first reference gap after attachment to the battery, and that is capable of deformation in a direction of reducing the first gap according to an external input,
    the second support body is disposed across a space in such a way that a second gap to a second surface of the battery intersecting the first surface becomes a second reference gap after attachment to the battery, includes a connection section to which the terminal of the electric wire extended outward is to be connected, and includes, on a side facing the second surface, at least one second spring member that contacts the second surface while maintaining the second reference gap after attachment to the battery, and that is capable of deformation in a direction of reducing the second gap according to an external input, the first spring member and the second spring member are each a flat spring that is formed into an arc, the first support body includes a first spring support section that is capable of supporting supported sections on both ends, in a circumferential direction, of the first spring member while relatively moving each of the supported sections according to the deformation, the second support body includes a second spring support section that is capable of supporting supported sections on both ends, in a circumferential direction, of the second spring member while relatively moving each of the supported sections according to the deformation, the at least one first spring member comprises a plurality of rectangular feet, and each of the rectangular feet are extended in opposite directions away from the arc and into cavities within the support member.

4. The battery connection unit according to claim 1, wherein the first spring member is a closest portion of the first support body to the first surface, wherein the second spring member is a closest portion of the second support body to the second surface, and wherein the first spring member and the second spring member are arranged in a widthwise center of the support member.

5. The battery connection unit according to claim 4, wherein the support member comprises an intersection at which the first support body is connected to the second support body, wherein the first spring member is closer to the intersection then to a furthest side of the first support body away from the intersection, and wherein the second spring member is closer to a furthest side, of the second support body away from the intersection, than to the intersection.

6. A battery connection unit comprising:

an electronic component that is electrically connected to a battery terminal that is physically and electrically connected to a battery post on a first surface of a battery, and that is electrically connected to a terminal of an electric wire; and an insulating support member that includes a first support body and a second support body that is continuous to the first support body in an intersected manner, and that supports the electronic component, wherein the first support body is disposed across a space in such a way that a first gap to the first surface becomes a first reference gap after attachment to the battery, and includes a fixed section to be connected to a fixing section of the battery terminal, wherein the second support body is disposed across a space in such a way that a second gap to a second surface of the battery intersecting the first surface becomes a second reference gap after attachment to the battery, and includes a connection section to which the terminal of the electric wire extended outward is to be connected, wherein at least one first spring member that contacts the first surface while maintaining the first reference gap after attachment to the battery, and that is capable of deformation in a direction of reducing the first gap according to an external input, is disposed on the first support body, on a side facing the first surface, wherein at least one second spring member that contacts the second surface while maintaining the second reference gap after attachment to the battery, and that is capable of deformation in a direction of reducing the second gap according to an external input, is disposed on the second support body, on a side facing the second surface, wherein the first spring member is a closest portion of the first support body to the first surface, wherein the second spring member is a closest portion of the second support body to the second surface, and wherein the first spring member and the second spring member are arranged in a widthwise center of the support member.

* * * * *